June 21, 1927.
H. BLIDSOE
1,633,239
TOOL HOLDER
Filed Oct. 9, 1925
2 Sheets-Sheet 1
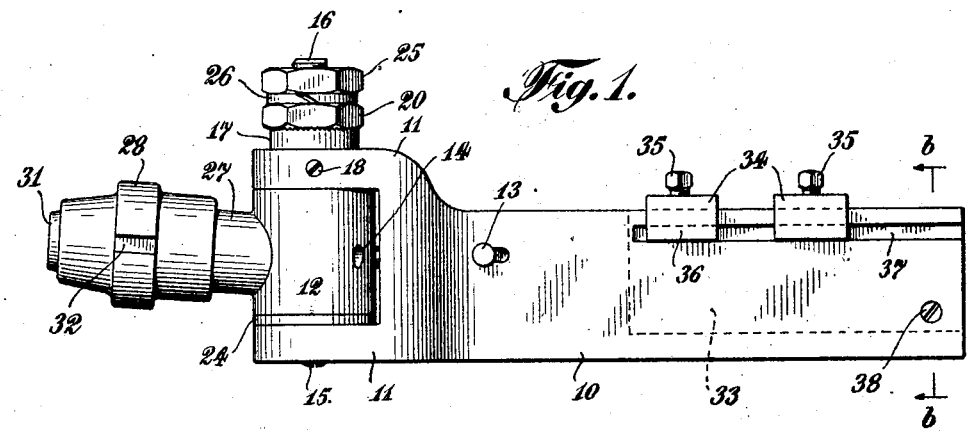
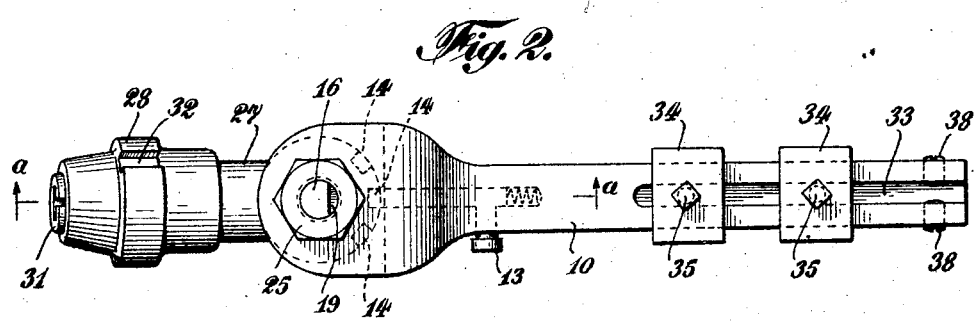
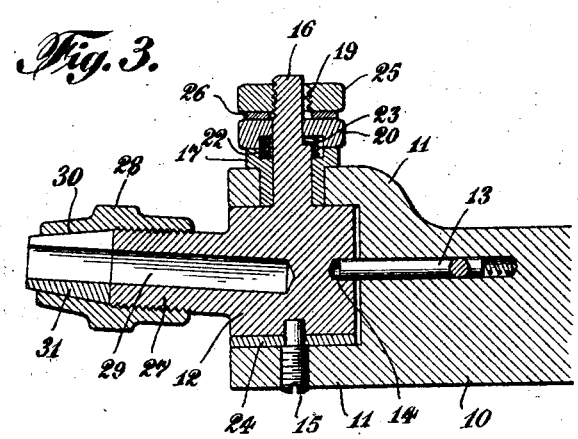
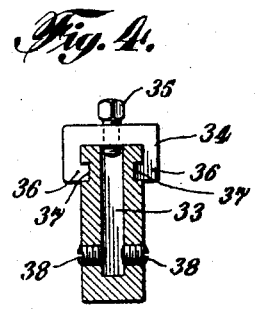
INVENTOR
*Hugo Blidsoe*
BY
*Peter M. Boesen*
ATTORNEY June 21, 1927.
H. BLIDSOE
TOOL HOLDER
Filed Oct. 9, 1925
1,633,239
2 Sheets-Sheet 2
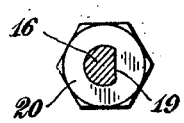
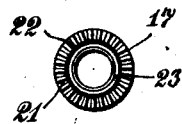
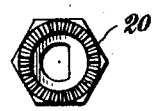
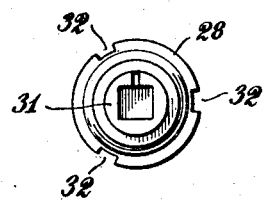
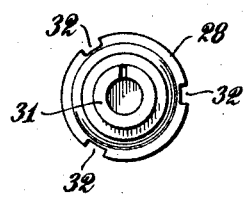
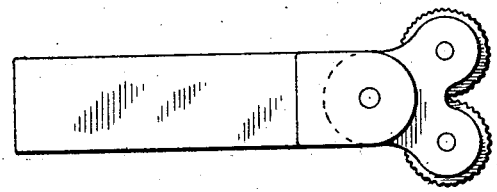
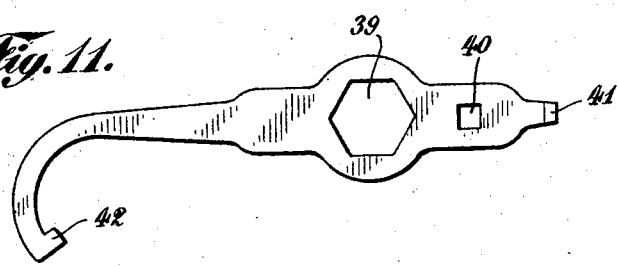
INVENTOR
Hugo Blidsoe
BY
Peter M. Boesen
ATTORNEY Patented June 21, 1927.

1,633,239

UNITED STATES PATENT OFFICE.

HUGO BLIDSOE, OF NEW YORK, N. Y.

TOOL HOLDER.

Application filed October 9, 1925. Serial No. 61,393.

This invention relates to new and useful improvements in tool holders and has for its object among other things, to provide a holder that will adjustably and rigidly hold a cutting tool therein for straight, as well as right or left hand operation, and one that can be produced at the minimum cost.

Another object is to provide a tool-holder that by adjustable means is adapted to receive square as well as round tool-bits.

Still another object of my invention is the construction of a tool holder in such a manner that it may be used for the operation of a knurling tool.

This tool holder may, as usually, be used with a lathe, planer or shaper.

The invention consists of the novel features, details of construction, and combination of parts, which will be set forth more fully in the following description and pointed out in the appended claims, and which are illustrated in the accompanying drawings forming a part of this specification; like numerals of reference designating corresponding parts in the several views:

Figure 1 is a side elevation of my improved tool holder. Fig. 2 is a top plan view of same; Fig. 3 is a transverse longitudinal section on line a—a of Fig. 2; Fig. 4 is a rear end section taken on line b—b of Fig. 1; Figs. 5, 6, 7, 8, 9, 10 and 11 are detail sectional views.

Referring to the drawings, 10 designates a body member, having two projecting jaws, 11, adapted to receive a sidewise turnable head 12; said head being provided with adjustable means to receive and hold a cutting bar, as will hereinafter more fully be described.

Said body is provided with an adjustable snap-stopper 13, the object of which is to secure the head 12 in a selected position, to which end said head has located in the same horizontal plane three orifices, or small stop holes, 14, adapted to receive said snap-stopper.

The head 12 has cylindrical sides and a flat top and bottom surface, the latter being provided with a small bore or hole in its center to form a pivotal seat for a set screw 15, inserted through the lower jaw 11; between said bottom surface and lower jaw I insert a washer 24 to secure steadiness of movement of the head.

The upper surface of said head has in its center and formed in one piece therewith a vertical axle 16, projecting through the upper jaw, said axle is rotatingly enclosed in a bushing 17, mounted in the upper jaw and retained therein by a screw 18. This axle is cylindrically shaped and is provided with a cut away portion 19 on its upper part, which permits a regulation-nut 20, fitted thereto to exert a turnable movement of said axle and head.

The upper part of the bushing 17 forms a collar, the surface of which has gear cuts extending around the periphery, as at 21 in Fig. 6; while the inner surface of said collar is provided with a depression 22, adapted to receive a coiled spring 23.

The regulation nut 20 has a correspondingly shaped surface facing said collar, as shown in Fig. 7, in order to secure a close fitting when they are locked together by application of the screw nut 25, which is threaded upon the top of the axle 16; to make said adjustment still more secure a split-washer 26, is inserted between said screw nut 25 and regulation nut 20.

The head 12 has a projecting neck 27 with a threaded end portion adapted to receive a correspondingly threaded chuck 28. Said neck has a preferably square bore 29 fitted to receive a tool-bit. The chuck has a round, tapered front opening 30 adapted to have inserted a correspondingly tapered split nut 31; this split nut may be provided with a square or round bore, as shown respectively in Figs. 8 and 9, in order to fit square as well as round tool-bits.

The chuck is at its outer periphery provided with three rectangular slits 32 for suitable engagement with a wrench when adjustment is needed.

The rear end of the body portion of said tool holder is formed with a channel 33 for the insertion of a flat tool, parting tool or a knurling tool, as the one shown in Fig. 10. Said channel has two adjustable slides 34 mounted across to secure a tight fitting when the tool is placed therein. Said slides are provided with top screws 35, and side fangs 36, the latter slidably engaging the body portion by means of recesses 37 provided therein.

At the lower end of said channel are inserted two set screws 38 to secure a tight grip on the inserted tool.

In order to quickly operate said tool holder I provide a spanner-wrench as shown in Fig. 11, wherein the opening 39 fits the screw-nut 25; the opening 40 fits the screws 35; while the square-cut end portion 41 is applicable to screws 38, and the hook portion 42 as a means of adjusting the chuck.

Having thus fully described my invention, what I claim as new and desire to secure by Letters Patent of the United States, is:

1. A tool holder as described, comprising in combination with the turnable head thereof, a vertical axle formed with said head, a bushing for rotatably receiving said axle, a collar on said bushing having a depression on one of its faces, and gear cuts on said face, a coil spring in said depression, means for retaining said axle in said bushing, and a means co-operating with said collar and spring for permitting the exertion of a turnable movement on said axle and head.

2. In a tool holder as described, a head, a vertical axle formed in the center of said head integral therewith and projecting therefrom, a bushing for rotatably receiving said axle, a collar at the upper end of said bushing provided with a depression in its inner face, gear cuts on said face, a coiled spring in said depression, a screw for retaining said axle in said bushing, and a means for permitting to exert a turnable movement of said axle and head, said means including a nut having gear cuts facing said collar and co-operating with said collar and spring.

3. In a tool holder as described, a turnable head, a vertical axle formed in the center of said head integrally therewith and projecting therefrom, a bushing for rotatably receiving said axle, a collar at the upper end of said bushing provided with a depression in its inner face, gear cuts on said face, a coiled spring in said depression, said axle being cylindrical and having a cut-away portion on its upper part, and a nut having gear cuts facing said collar, fitted to the cut-away portion of said axle co-operating with said collar and spring for permitting to exert a turnable movement of said axle and head.

4. In a tool holder as described, a body member having a channel formed in its rear end, adapted to receive a flat tool, two adjustable slides mounted across the channel of said body member, side fangs on said slides engaging recesses of said body member, top screws in said slides, and side screws in said body to engage and hold the tool inserted in said channel.

In testimony whereof I have hereunto affixed my signature.

HUGO BLIDSOE.